United States Patent [19]

Kregloh

[11] Patent Number: 5,572,795
[45] Date of Patent: Nov. 12, 1996

[54] MAGNIFICATION DEVICE LENS ASSEMBLY

[76] Inventor: Daniel J. Kregloh, 78 Parklawn Rd., West Roxbury, Mass. 02132

[21] Appl. No.: 278,177

[22] Filed: Jul. 21, 1994

[51] Int. Cl.$^6$ ............................ G03B 13/02; G02B 25/00
[52] U.S. Cl. ................................................ 33/244; 33/251
[58] Field of Search .................... 33/244, 251; 359/600, 359/601

[56] References Cited

U.S. PATENT DOCUMENTS

| | | | |
|---|---|---|---|
| 42,983 | 5/1864 | Wood | 33/277 |
| 1,353,151 | 9/1920 | Deming | 33/251 |
| 3,315,362 | 4/1967 | Palmer | 33/244 |
| 3,381,381 | 5/1968 | Ruchlis | 33/277 |
| 3,390,931 | 7/1968 | Luning et al. | 33/244 |
| 4,283,860 | 8/1981 | Rucker | 33/277 |
| 4,850,113 | 7/1989 | Doll | 33/233 |
| 4,926,560 | 5/1990 | Kilgore et al. | 33/244 |
| 5,201,135 | 4/1993 | Cowles | 33/244 |

Primary Examiner—Christopher W. Fulton
Attorney, Agent, or Firm—Iandiorio & Teska

[57] ABSTRACT

A magnification device lens assembly for sharpening the focus of the field of view of a magnification device to provide greater accuracy includes a base portion having first and second apertured ends; the first end being interconnected with a magnification device lens; and an extension portion extending outwardly from the second end of the base portion; the first end of the extension portion being interconnected with the second end of the base portion and the second end of the extension portion having an aperture with a diameter smaller than the diameter of the base portion and smaller than the magnification device lens for sharpening the focus of the field of view of the magnification device.

29 Claims, 2 Drawing Sheets

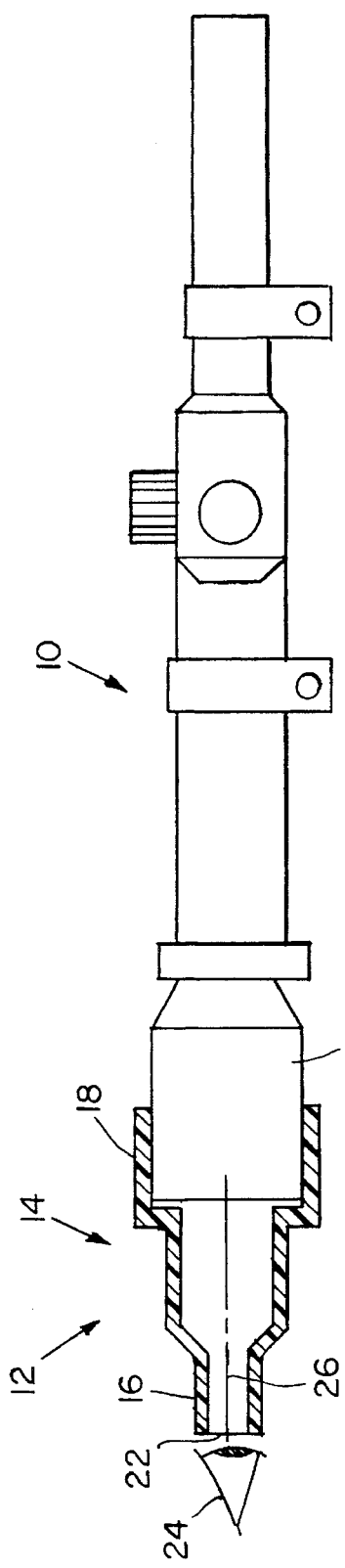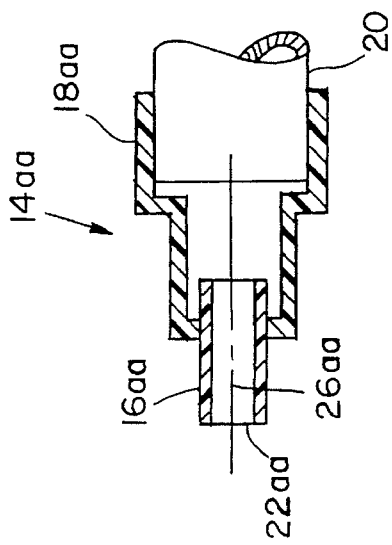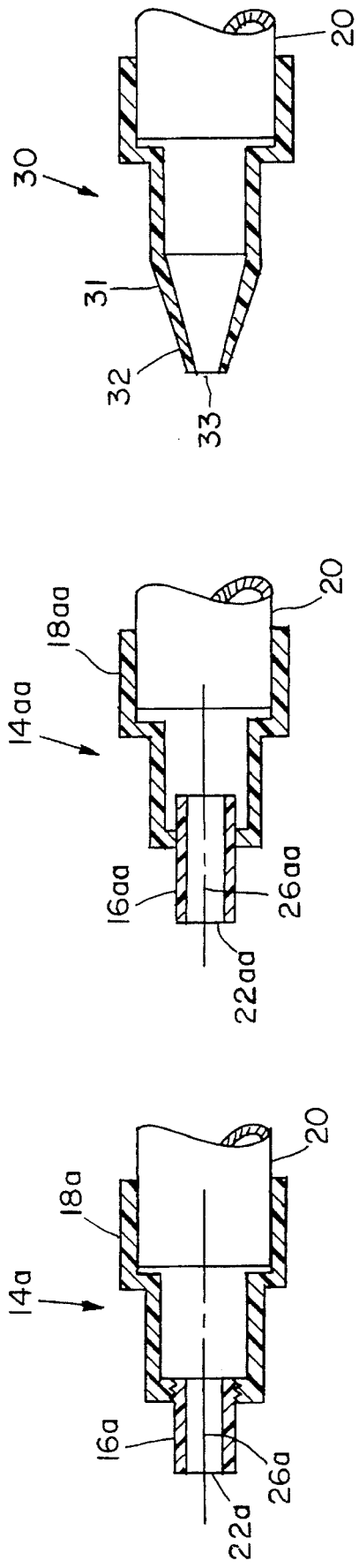

MAGNIFICATION DEVICE LENS ASSEMBLY

FIELD OF INVENTION

This invention relates to an magnification device lens assembly for sharpening the focus of the field of view of a magnification device.

BACKGROUND OF INVENTION

Magnification devices, such as telescopes used, for example, with rifles or other types of firearms are useful in increasing a user's accuracy with the firearm by increasing the size of and improving the focus of the image of objects of interest within the field of view of the telescope.

Due to the size of the diameter of the eyepiece lenses of many telescopes much reflected light is allowed to enter the user's eye and impinge on the user's retina. Because of this, the sharpness of the focus of objects within the field of view of the telescope is degraded. This occurs because light that is reflected onto the user's retina decreases the contrast of the objects of interest within the telescope field of view which causes the objects of interest to appear less sharp to the user. This results in a decrease in the user's accuracy with the firearm.

Other types of magnification devices, such as binoculars and camera lenses have large diameter viewing lenses located at the end where light enters the magnification devices. These viewing lenses also allow much reflected light into the eye and similarly decrease the contrast of objects within the field of view of the device.

Thus, while telescopes and other magnification devices alone provide increased sharpness of focus they do have certain limitations and drawbacks that do not provide the user with optimum imaging of objects of interest within the field of view of the devices.

SUMMARY OF INVENTION

It is therefore an object of this invention to provide a magnification device lens assembly that sharpens the focus of the field of view of a magnification device.

It is a further object of this invention to provide a magnification device lens assembly that decreases the amount of reflected light impinging on the retina of the user's eye, thereby increasing the contrast of objects of interest within the field of view of the device.

It is a further object of this invention to provide a magnification device lens assembly that provides a sharper image of objects of interest within the field of view of the device.

It is a further object of this invention to provide a magnification device lens assembly that provides greater accuracy than the magnification device alone.

The invention results from the realization that a truly effective magnification device lens assembly for sharpening the focus of the field of view of a magnification device to provide greater accuracy can be achieved by providing a base portion having first and second apertured ends wherein the first end is interconnected with a magnification device lens and an extension portion extends outwardly from the second end of the base portion and has first and second apertured ends. The first end of the extension portion is interconnected with the second end of the base portion and the second end of the extension portion has an aperture with a diameter smaller than the diameter of the base portion and smaller than the diameter of the magnification device lens.

This invention features a magnification device lens assembly for sharpening the focus of the field of view of a magnification device to provide greater accuracy. The assembly includes a base portion having first and second apertured ends. The first end is interconnected with a magnification device lens. The assembly also includes an extension portion extending outwardly from the second end of the base portion. The extension portion has first and second apertured ends. The first end of the extension portion is interconnected with the second end of the base portion and the second end of the extension portion has an aperture with a diameter smaller than the diameter of the base portion and smaller than the diameter of the magnification device lens for sharpening the focus of the field of view of the magnification device.

In a preferred embodiment the base portion may be integrally or removeably interconnected with the magnification device lens. The base portion and the extension portion may be integrally interconnected. The base portion and the extension portion may be removeably interconnected. The base portion and the extension portion may be removeably interconnected by thread means on the base portion and the extension portion. The base portion and the extension portion may be slidably engaged. The base portion and the extension portion may be cylindrical in shape. The extension portion may be square, triangular, or hexagonal in shape. The extension portion may comprise at least two telescoping sections. The base portion and the extension portion may be formed of a rigid material. The plane of the second apertured end of the extension portion may be oriented perpendicular to the optical axis of the magnification device. The lens may be the eyepiece lens or the viewing lens of the magnification device.

The invention also features a magnification device lens assembly for sharpening the focus of the field of view of a magnification device to provide greater accuracy. The assembly includes a cylindrical base portion having a central hollow volume terminating at first and second apertured ends. The first end is interconnected with a magnification device lens. The assembly also includes a cylindrical extension portion which has a central hollow volume terminating at first and second apertured ends and which extend outwardly from the second end of the base portion. The first apertured end of the extension portion is interconnected with the second end of the base portion and the second end of the extension portion has an aperture with a diameter smaller than the diameter of the base portion and smaller than the diameter of the magnification device lens for sharpening the focus of the field of view of the magnification device.

In a preferred embodiment the diameter of the central hollow volume of the base portion may be tapered and the diameter of the base portion may decrease from the first apertured end to the second apertured end. The diameter of the central hollow volume of the extension portion may be the same from the first apertured end to the second apertured end. The diameter of the central hollow volume of the extension portion may be tapered and the diameter of the extension portion may decrease from the first apertured end to the second apertured end.

The invention further features a magnification device lens assembly kit. The kit includes at least one base portion having first and second apertured ends. The first end is interconnected with a magnification device lens. The kit also includes at least two extension portions each having first and second apertured ends. The first apertured ends of the extension portions are interchangeably, removeably interconnected with the second end of the base portion and the second ends of the extension portions have diameters smaller than the diameters of the base portion and smaller than the diameter of the magnification device lens for sharpening the focus of the field of view of the magnification device.

In a preferred embodiment the base portion and the extension portions may be interchangeably, removeably interconnected by thread means on the base portion and the extension portions. The base portion and the extension portions may be slidably engaged. The base portion and the extension portions may be cylindrical in shape. The extension portions may be square, triangular or hexagonal in shape. The diameter of the second apertured ends of the extension portions may range in diameter from approximately ⅛ inch to 3 inches. The combined length of the at least one base portion and each one of the at least two extension portions may be approximately ½ inch to 8 inches.

DISCLOSURE OF PREFERRED EMBODIMENT

Other objects, features and advantages will occur to those skilled in the art from the following description of a preferred embodiment and the accompanying drawings, in which:

FIG. 1 is a cross-sectional view of the magnification device lens assembly according to this invention affixed to the eyepiece lens of a rifle scope;

FIG. 2A is a cross-sectional view of an alternative embodiment of the magnification device lens assembly according to this invention with the base portion and extension portion being interconnected by thread means;

FIG. 2B is a cross-sectional view of an alternative embodiment of the magnification device lens assembly according to this invention in which the base portion and the extension portion are slidably engaged;

FIG. 3 is a cross-sectional view of an alternative construction of the magnification device lens assembly according to this invention wherein the base portion and extension portion are tapered;

Figure 7:
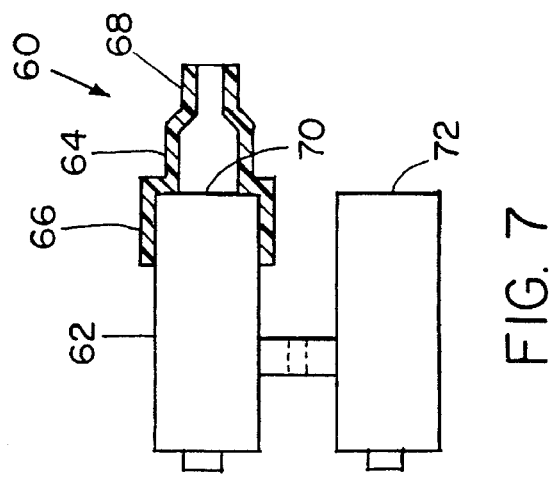
FIG. 7 is a cross-sectional view of the magnification device lens assembly as shown in FIG. 1 affixed to the viewing lens of binoculars.

In FIG. 1 there is shown a conventional rifle scope 10 provided with magnification devices lens assembly 12. Lens assembly 12 includes base portion 14 and extension portion 16 which are typically formed of a rigid plastic material and which are typically cylindrical in shape and integrally interconnected. Base portion 14 includes mounting member 18 which allows the assembly 12 to be removeably attached to eyepiece lens 20 of scope 10. Mounting member 18 slidably engages eyepiece lens 20 or mounting member 18 and eyepiece lens 20 may be engaged by thread means. Extension portion 16 extends outwardly from base portion 14 and terminates at apertured end 22. The eye 24 of a person using the scope 10 may look through the apertured end 22 along the optical axis 26 of scope 10. The diametric plane of apertured end 22 of extension portion 16 is perpendicular to the optical axis 26 and the diameter 22 may typically range from approximately ⅛ inch to 3 inches. The total length of magnification device lens assembly 12 may typically range from approximately ½ inch to 8 inches. The diameter of apertured end 22 is smaller than the diameter of base portion 14 and lens 20.

The optical lens assembly 12 restricts the amount of reflected light that can enter the user's eye and impinge on the retina. This increases the contrast of objects of interest within the field of view of the telescope 10 and therefore provides a sharpening of the focus of those objects.

In an alternative embodiment, instead of being integrally interconnected, base portion 14a, FIG. 2A, may be interconnected with extension portion 16a by thread means 28 on both the base and extension portions. In a similar manner base portion 14aa, FIG. 2B may be interconnected with extension portion 16aa by slidably engaging the two portions.

In another embodiment, base portion 30, FIG. 3, includes a tapered section 31 which is integrally interconnected with extension portion 32 which itself tapers from its interconnection with base portion 30 to apertured end 33. In this embodiment, although not shown, base portion 30 and extension portion 32 may also be removeably interconnected by threading or slidably engaging the base and extension portions.

Figure 4:
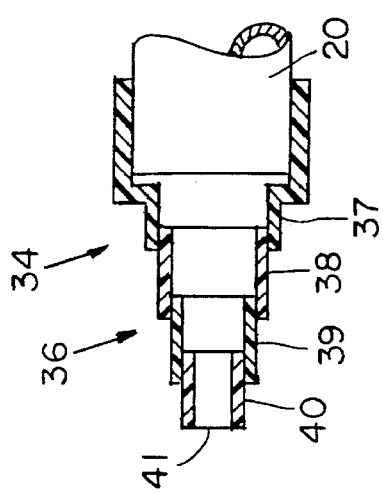
FIG. 4 is a cross-sectional view of another alternative embodiment of the magnification device lens assembly according to this invention wherein there is a base portion and an extension portion having a plurality of telescoping sections.

In yet another embodiment there is shown base portion 34, FIG. 4, which is removeably attached to eyepiece lens 20. There is also shown an extension portion 36 which comprises telescoping extension sections 37, 38, 39 and 40. The diameter of apertured end 41 of telescoping section 40 is smaller than the diameter of base section 34 and is smaller than the diameter of eyepiece lens 20 in accordance with this invention.

By making the base and extension portions removeably interconnected with each other and the base portion removeably attachable to the eyepiece lens 20, this invention is very suitable to kit form. That is, base portions of various lengths and diameters may be utilized. Moreover, extension portions also with various lengths and diameters may be utilized. The only limitations on the kit are that the apertured end of the extension portions must have a smaller diameter than the diameter of the base portions and the diameter of the telescope eyepiece lens. Also, as indicated above, the general dimensions of the magnification device lens assembly according to this invention are approximately ½ inch to 8 inches in length and the apertured ends of the extension portions are ⅛ inch to 3 inches in width. These dimensions depend on the size of the eyepiece lens and the particular configuration the user desires.

Figure 5:
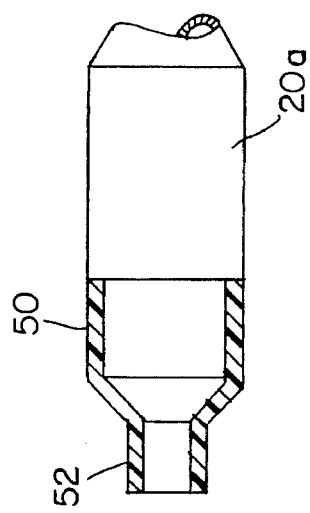
FIG. 5 is a cross-sectional view of yet another alternative embodiment of the magnification device lens assembly according to this invention wherein the eyepiece unit and the base portion are integrally interconnected.

Alternatively, base portion 50, FIG. 5, may be integrally interconnected with eyepiece lens 20a. Extension portion 52, as with the other embodiments, may be integrally interconnected with base portion 50 or it may be interconnected by threading or slidably engaging the base and extension portions. This embodiment is also suited to kit form in that various sized and shaped extension portions can be utilized.

Figure 6A:
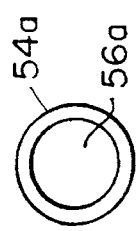
FIG. 6A is an end view of the extension portion with a round apertured end.
Figure 6B:
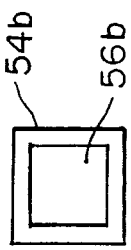
FIG. 6B is an end view of the extension portion with a square apertured end.
Figure 6C:
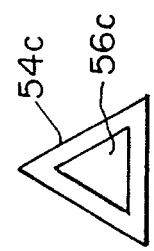
FIG. 6C is an end view of the extension portion with a triangular apertured end.
Figure 6D:
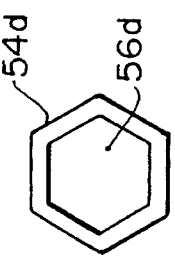
FIG. 6D is an end view of the extension portion with a hexagonal apertured end.

The extension portions of FIGS. 1–5 are shown to be cylindrical in shape, however, this is not a necessary limitation of this invention. The end views of various shaped extension portions are shown in FIGS. 6A–D which may be utilized with any of the above described embodiments. FIG. 6A depicts the end of a typical extension portion 54a with a circular apertured end 56a. FIG. 6B depicts extension portion 54b with a square apertured end 56b and FIG. 6C shows a triangular extension portion 54c with apertured end 56c. Finally, FIG. 6D, shows an extension portion 54d with a hexagonal apertured end 56d.

While each of the previous embodiments have shown the device according to this invention used with a telescope and affixed to the eyepiece lens, this is not a necessary limitation of this invention. As shown in FIG. 7, magnification device assembly 60 may be used in conjunction with binoculars 62 or a similar magnification device such as a camera lens. Assembly 60 includes base portion 64, mounting member 66 and extension portion 68. Mounting member 66 allows assembly 60 to be interconnected with viewing lens 70 of the binoculars 62. Although not shown, another assembly would be attached to the other viewing lens 72. Assembly 60 is shown to be structurally the same as assembly 12, FIG. 1, however, this assembly could be configured according to any of the embodiments of FIGS. 2 through 6.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A telescope eyepiece assembly having a fire end for affixing to a telescope eyepiece and a second end through which a user views for sharpening the focus of the field of view of a telescope to provide greater accuracy, comprising:

a base portion having first and second apertured ends; said first end being interconnected with a telescope eyepiece; and an extension portion extending outwardly from the second end of said base portion and having first and second apertured ends; the first end of said extension portion being interconnected with the second end of said base portion and the second end of said extension portion having an aperture located at the second end of the telescope eyepiece assembly for positioning proximate the user's eye with a diameter smaller than the diameter of said base portion and smaller than the diameter of the telescope eyepiece for sharpening the focus of the field of view of the telescope.

2. The telescope eyepiece assembly of claim 1 in which said base portion is integrally interconnected with the telescope eyepiece.

3. The telescope eyepiece assembly of claim 1 in which said base portion is removably interconnected with the telescope eyepiece.

4. The telescope eyepiece assembly of claim 1 in which said base portion and said extension portion are integrally interconnected.

5. The telescope eyepiece assembly of claim 1 in which said base portion and said extension portion are removably interconnected.

6. The telescope eyepiece assembly of claim 5 in which said base portion and said extension portion are removably interconnected by thread means on said base portion and said extension portion.

7. The telescope eyepiece assembly of claim 5 in which said base portion and said extension portion are slidably engaged.

8. The telescope eyepiece assembly of claim 1 in which said base portion is cylindrical in shape.

9. The telescope eyepiece assembly of claim 8 in which the extension portion Is cylindrical in shape.

10. The telescope eyepiece assembly of claim 8 in which said extension portion is square in shape.

11. The telescope eyepiece assembly of claim 8 in which said extension portion is triangular in shape.

12. The telescope eyepiece assembly of claim 8 in which said extension portion is hexagonal in shape.

13. The telescope eyepiece assembly of claim 1 in which said extension portion comprises at least two telescoping sections.

14. The telescope eyepiece assembly of claim 1 in which said base portion and said extension portion are formed of a rigid material.

15. The telescope eyepiece assembly of claim 1 in which the plane of the second apertured end of said extension portion is oriented perpendicular to the optical axis of the telescope eyepiece.

16. A telescope eyepiece assembly having a first end for affixing to a telescope eyepiece and a second end through which a user views for sharpening the focus of the field of view of a telescope to provide greater accuracy, comprising:

a cylindrical base portion having a central hollow volume terminating at first and second apertured ends; said first end interconnected with the telescope eyepiece; and a cylindrical extension portion having a central hollow volume terminating at first and second apertured ends, and extending outwardly from the second end of said base portion; the first apertured end of said extension portion being interconnected with the second end of said base portion and the second end of said extension portion having an aperture located at the second end of the telescope evepiece assembly for positioning proximate the user's eye with a diameter smaller than the diameter of said base portion and smaller than the diameter of the telescope eyepiece for sharpening the focus of the field of view of the telescope.

17. The telescope eyepiece assembly of claim 16 in which the diameter of the central hollow volume of said base portion is tapered and the diameter of said base portion decreases from the first apertured end to the second apertured end.

18. The telescope eyepiece assembly of claim 16 in which the diameter of the central hollow volume of said extension portion is the same from the first apertured end to the second apertured end.

19. The telescope eyepiece assembly of claim 16 in which the diameter of the central hollow volume of said extension portion is tapered and the diameter of said extension portion decreases from the first apertured end to the second apertured end.

20. A kit for a telescope eyepiece assembly having a first end for affixing to a telescope eyepiece and a second end through which a user views, comprising:

at least one base portion having first and second apertured ends; said first end interconnected with a telescope eyepiece; and at least two extension portions each having first and second apertured ends; the first apertured ends of said extension portions being interchangeably, removably interconnected with the second end of said base portion and the second ends of said extension portions being located at the second end of the telescope eyepiece assembly for positioning proximate the user's eye having diameters smaller than the diameter of said base portion and smaller than the diameter of the telescope eyepiece for sharpening the focus of the field of view of the telescope.

21. The telescope eyepiece assembly kit of claim 20 in which said base portion and said extension portions are interchangeably, removably interconnected by thread means on said base portion and said extension portions.

22. The telescope eyepiece assembly kit of claim 20 in which said base portion and said extension portions are slidably engaged.

23. The telescope eyepiece assembly kit of claim 20 in which said base portion is cylindrical in shape.

24. The telescope eyepiece assembly kit of claim 20 in which at least one of said extension portions is cylindrical in shape.

25. The telescope eyepiece assembly kit of claim 20 in which at least one of said extension portions is square in shape.

26. The telescope eyepiece assembly kit of claim 20 in which at least one of said extension portions is triangular in shape.

27. The telescope eyepiece assembly kit of claim 20 in which at least one of said extension portions is hexagonal in shape.

28. The telescope eyepiece assembly kit of claim 20 in which the diameter of the second apertured ends of said extension portions range in diameter from approximately ⅛" to 3".

29. The telescope eyepiece assembly kit of claim 20 in which the combined length of said at least one base portion and each one of said at least two said extension portions is approximately ½" to 8".

* * * * *

UNITED STATES PATENT AND TRADEMARK OFFICE
CERTIFICATE OF CORRECTION

PATENT NO. : 5,572,795
DATED : November 12, 1996
INVENTOR(S) : Kregloh

It is certified that error appears in the above-indentified patent and that said Letters Patent is hereby corrected as shown below:

Column 5, line 37, please replace "fire" with --first--.

Column 6, line 10, please replace "Is" with --is--.

Column 6, line 41, please replace "evepiece" with --eyepiece--.

Signed and Sealed this

Fourth Day of March, 1997

*Attest:*

BRUCE LEHMAN

*Attesting Officer*     *Commissioner of Patents and Trademarks*